United States Patent
Matsuhira (10) Patent No.: US 7,860,325 B2
(45) Date of Patent: Dec. 28, 2010

(54) IMAGE PROCESSING APPARATUS AND IMAGE PROCESSING METHOD FOR PARALLEL DECOMPRESSION OF IMAGE FILES

(75) Inventor: Masatoshi Matsuhira, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 916 days.

(21) Appl. No.: 11/789,623

(22) Filed: Apr. 25, 2007

(65) Prior Publication Data

US 2007/0280543 A1    Dec. 6, 2007

(30) Foreign Application Priority Data

Apr. 25, 2006   (JP)   .............. 2006-120655

(51) Int. Cl.
G06K 9/36    (2006.01)
G06K 9/46    (2006.01)

(52) U.S. Cl. .................................... 382/234
(58) Field of Classification Search ............ 382/164, 382/167, 190, 232–234, 246, 250, 251, 253, 382/276, 294–297, 304–305; 341/50, 51, 341/55, 65, 67, 77, 87; 358/1.9, 1.13, 261.1, 358/426.13, 427, 515, 518, 523, 525; 345/589, 345/591, 600–604; 375/240.15, 240.25; 700/2, 4, 9; 712/245
See application file for complete search history.

(56) References Cited

U.S. PATENT DOCUMENTS 6,009,205 A * 12/1999 Yoshida .................... 382/246

| 6,587,735 | B1 | 7/2003 | Yaguchi |
| 6,611,214 | B1 * | 8/2003 | Watkins ................... 341/51 |
| 6,657,569 | B2 * | 12/2003 | Barnett .................... 341/65 |
| 7,373,001 | B2 * | 5/2008 | Kondo et al. ............. 382/232 |
| 2003/0028673 | A1 * | 2/2003 | Lin et al. ................. 709/247 |
| 2006/0004997 | A1 * | 1/2006 | Mykland ................. 712/244 |
| 2006/0023955 | A1 | 2/2006 | Namera et al. |
| 2007/0041444 | A1 * | 2/2007 | Gutierrez Novelo ... 375/240.15 |
| 2007/0280543 | A1 * | 12/2007 | Matsuhira ................ 382/233 |

FOREIGN PATENT DOCUMENTS

| JP | 06-217104 A | 8/1994 |
| JP | 2001-27986 A | 1/2001 |
| JP | 2001-080138 | 3/2001 |
| JP | 2001-080139 | 3/2001 |
| JP | 3661520 | 3/2001 |
| JP | 2002-314782 A | 10/2002 |
| JP | 2004-253906 | 9/2004 |
| JP | 2005-252580 | 9/2005 |
| JP | 2006-49991 | 2/2006 |
| JP | 2006-304243 | 11/2006 |
| JP | 2006-325186 | 11/2006 |
| WO | WO 2005/086470 | 9/2005 |

* cited by examiner

Primary Examiner—Amir Alavi
(74) Attorney, Agent, or Firm—Nutter McClennen & Fish LLP; John J. Penny, Jr.; Michael P. Visconti, III (57) ABSTRACT

An image processing method according to one aspect of the present invention is an image processing method for decompressing a compressed image data file using at least one of a hardware-based decompression processing and a software-based decompression processing, wherein both of the hardware-based decompression processing and the software-based decompression processing are performed in parallel when a plurality of compressed image data files are present as a decompression processing subject.

7 Claims, 7 Drawing Sheets

IMAGE PROCESSING APPARATUS AND IMAGE PROCESSING METHOD FOR PARALLEL DECOMPRESSION OF IMAGE FILES

CROSS REFERENCE TO RELATED APPLICATION

This subject application is related to subject matter disclosed in Japanese Patent Application No. 2006-120655 filed on Apr. 25, 2006 in Japan to which the subject application claims priority under Paris Convention and which is incorporated herein by reference.

BACKGROUND OF THE INVENTION

1. Field of the Invention

The present invention relates to an image processing apparatus and an image processing method. More specifically, the present invention relates to an image processing apparatus and an image processing method for efficiently performing a decompression processing, that is, a processing for decompressing image data stored as compressed image data, as a preprocessing of a processing for converting image data into optimum print data.

2. Related Art

When printing Is to be performed based on image data, typically, original image data is not used as it is. A correction processing is generally performed on the original image data so that a printer can print image data and obtain an optimum printing result when performing the printing. After the correction processing, the image data is converted into print data, and the printing is performed using the print data.

The image data is usually stored as compressed image data. Due to this, it is necessary to decompress a compressed image data of the compressed image data before the image data is converted into the print data.

Conventional techniques of performing the decompression processing for decompressing the compressed image data in a standalone printer unconnected to a computer include one for performing the decompression processing using a decompression processing program as software executed by an arithmetic processing device included in the printer. Such a technique is disclosed in, for example, Japanese Patent No. 3661520.

However, the decompression processing by execution of the decompression processing program produces a heavy load. In the hardware environment of a low-price arithmetic processing device normally included in the standalone printer, the heavy load caused by the decompression processing is one cause for performance deterioration.

Examples of a conventional technique for solving the problem of performance deterioration include the following decompression processing technique. Compressed image data is decompressed using hardware by storing such parameters as a file pointer and a rotation information map and such tables as a Huffman decompression table and a quantization table necessary to decompress the compressed image data file in a storage device such as a RAM, an EEPROM or an HDD (hard disk drive), loading those parameters and tables from the storage device into a processing device (hardware) such as an ASIC (application specific integrated circuit) or an arithmetic processing device, and using the parameters and tables loaded into the hardware.

The hardware-based decompression processing performed on the compressed image data is characterized by executing the decompression processing by loading the parameters and the tables into the processing apparatus such as the ASIC from the storage device before using the parameters and the tables without performing the decompression processing using the software executed by the arithmetic processing device. In many cases, the hardware-based, decompression processing has a higher decompression processing rate than that of the software-based based decompression processing.

However, the hardware-based decompression processing has the following disadvantages. If a plurality of image data files included in a print page data file as a printing subject, i.e., a plurality of compressed image data files to be subjected to the decompression processing prior to execution of printing is present, and those compressed image data files are decompressed in parallel using the hardware-based decompression processing technique, then overhead for loading the parameters such as a file pointer and a rotation information map and the tables such as a Huffman decompression table and a quantization table in an SRAM, a register or the like for each image data file and replacing decompression progress information is increased. The longer overhead makes it difficult to perform the hardware-based decompression processing at the higher processing rate than that of the software-based decompression processing.

As stated, the software-based decompression processing is generally lower in processing rate than the hardware-based decompression processing. However, a plurality of compressed image data files as a decompression processing subject is present, that is, if the compressed image data files are switched over frequently, the software-based decompression processing can make such switching easily at high speed, as compared with the hardware-based decompression processing. As a result, the software-based decompression processing can be performed at a higher processing rate than that of the hardware-based decompression processing.

SUMMARY OF THE INVENTION

It is an object of the present invention to provide an image processing apparatus and an image processing method capable of accelerating a decompression processing rate even if a plurality of compressed image data files is present as a decompression processing subject while basically using a hardware-based decompression processing that can be performed at high processing rate in many cases.

According to one aspect of the present invention, there is provided an image processing method for decompressing a compressed image data file using at least one of a hardware-based decompression processing and a software-based decompression processing, wherein both of the hardware-based decompression processing and the software-based decompression processing are performed in parallel when a plurality of compressed image data files are present as a decompression processing subject.

According to one detailed aspect of the present invention, there is provided an image processing method comprising:

a first processing step of acquiring and loading a plurality of tables including a predetermined decompression table and a quantization table necessary to decompress a compressed image data file from a first storage device storing therein the plurality of tables and a decompression processing program for decompressing the compressed image data file, acquiring and loading a plurality of parameters including a rotation information map and a file pointer created and updated while the compressed image data file is being decompressed from a second storage device storing therein the plurality of parameters, and decompressing the compressed image data file; and a second processing step reading and executing the decompression processing program stored in the first storage device, and acquiring and reading the plurality of tables stored in the first storage device and the plurality of parameters stored in the second storage device, thereby decompressing the compressed image data file, wherein the first processing step and the second processing step are used in parallel, and one of the compressed image data files is decompressed at the first processing step, and remaining compressed image data files are decompressed at the second processing step when a plurality of compressed image data files are decompressed by a parallel processing.

According to the aspect of the present invention, it is possible to provide the image processing method capable of accelerating the decompression processing rate whether the decompression processing subject is a single compressed image data file or a plurality of compressed image data files, since the hardware-based decompression processing and the software-based decompression processing are performed in parallel when a plurality of compressed image data files as the decompression processing subject is present, while the hardware-based decompression processing that enables a high-rate decompression processing in many cases is basically used.

In the image processing method according to the one aspect of the present invention, the compressed image data file is decompressed at the first processing step when the decompression processing subject is one compressed image data file.

The compressed image data file as the decompression processing subject may be compressed by JPEG compression, JPEG being Joint Photographic Experts Group.

The compressed image data file as the decompression processing subject may be subjected to an image correction processing after being decompressed.

According to one aspect of the present invention, there is provided an image processing apparatus comprising:

a first storage device storing therein a plurality of tables including a predetermined decompression table and a quantization table necessary to decompress a compressed image data file, and storing therein a decompression processing program for decompressing the compressed image data file;

a second storage device storing therein a plurality of parameters including a rotation information map and a file pointer created and updated while the compressed image data file is being decompressed;

a first processing device acquiring and loading the plurality of tables stored in the first storage device and the plurality of parameters stored in the second storage device, and decompressing the compressed image data file; and a second processing device reading and executing the decompression processing program stored in the first storage device, and acquiring and reading the plurality of tables stored in the first storage device and the plurality of parameters stored in the second storage device, thereby decompressing the compressed image data file, wherein one of the compressed image data files is decompressed by the first processing device, and remaining compressed image data files are decompressed by the second processing device when a plurality of compressed image data files are decompressed by a parallel processing.

According to the aspect of the present invention, it is possible to provide the image processing apparatus capable of accelerating the decompression processing rate whether the decompression processing subject is a single compressed image data file or a plurality of compressed image data files, since the hardware-based decompression processing and the software-based decompression processing are performed in parallel when a plurality of compressed image data files as the decompression processing subject is present, while the hardware-based decompression processing that enables a high-rate decompression processing in many cases is basically used.

In the image processing apparatus according to the one aspect of the present invention, the compressed image data file is decompressed by the first processing device when a decompression processing subject is one compressed image data file.

The compressed image data file as a decompression processing subject may be stored in a predetermined recording medium, and read by and input to at least one of the first processing device and the second processing device.

The compressed image data file as the decompression processing subject may be compressed by JPEG compression, JPEG being Joint Photographic Experts Group.

The compressed image data file as the decompression processing subject may be subjected to an image correction processing after being decompressed.

The first processing device and the second processing device may be different processing devices or the same processing device can be used as both the first processing device and the second processing device.

The first storage device and the second storage device may be different storage devices or the same storage device can be used as both the first storage device and the second storage device.

DETAILED DESCRIPTION OF THE EMBODIMENTS

An image processing apparatus and an image processing method according to embodiments of the present invention will be described hereinafter in detail with reference to the accompanying drawings.

Timings of securing and releasing memory areas for acquiring such parameters as a file pointer and a rotation information map and such tables as a Huffman decompression table and a quantization table necessary for the decompression processing to correspond to each of images, and for holding the parameters and the tables to correspond to each image, and a configuration of the memory area when a plurality of image data files included in a print page data file as a printing subject, i.e., a plurality of compressed image data files to be subjected to a decompression processing prior to execution of printing is present and the compressed image data files are decompressed in parallel will be described.

Figure 1:
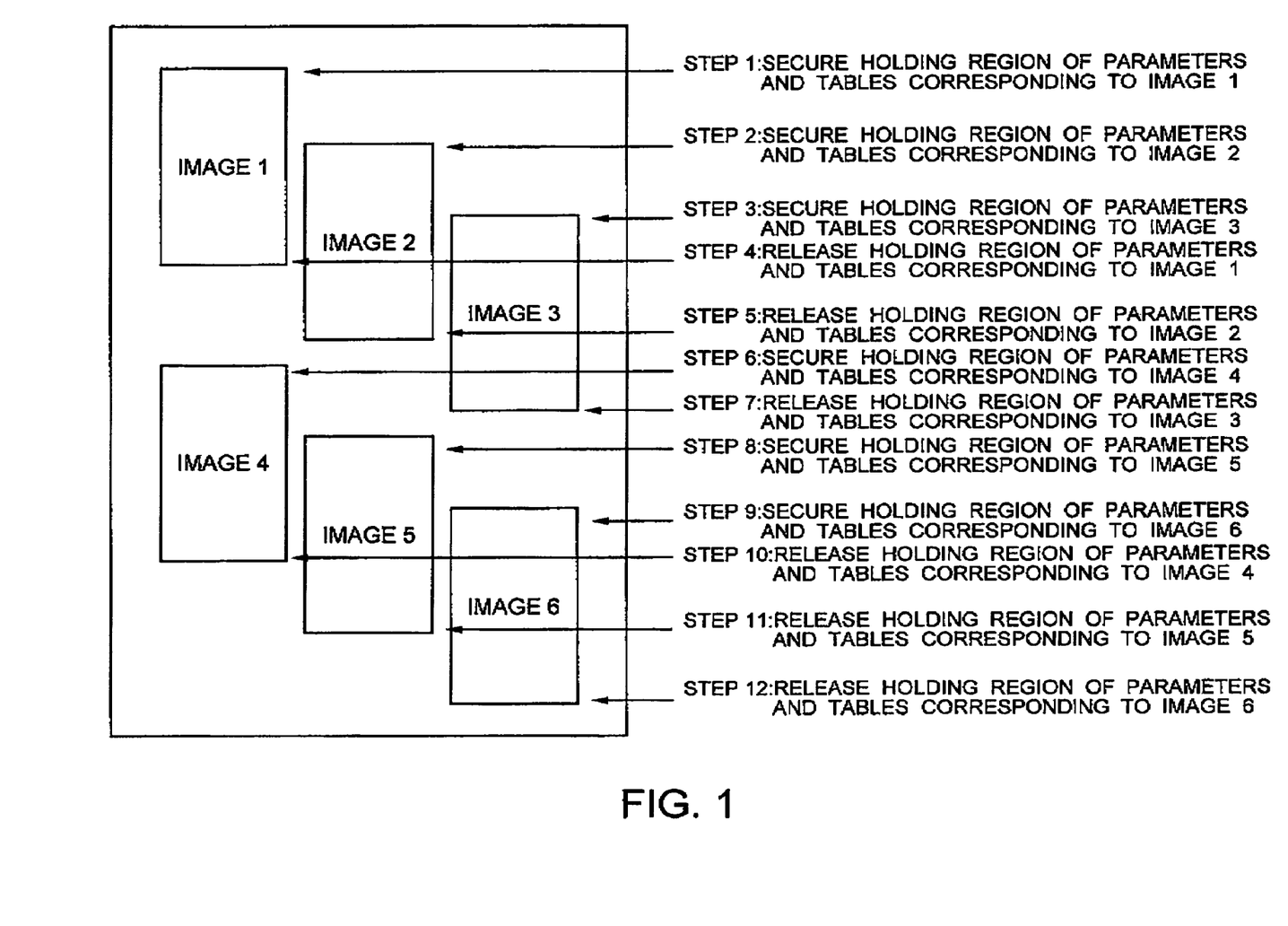
FIG. 1 is an explanatory view typically showing timings of securing and releasing parameters and tables to correspond to each of images when a plurality of compressed image data files is decompressed in parallel.
Figure 2:
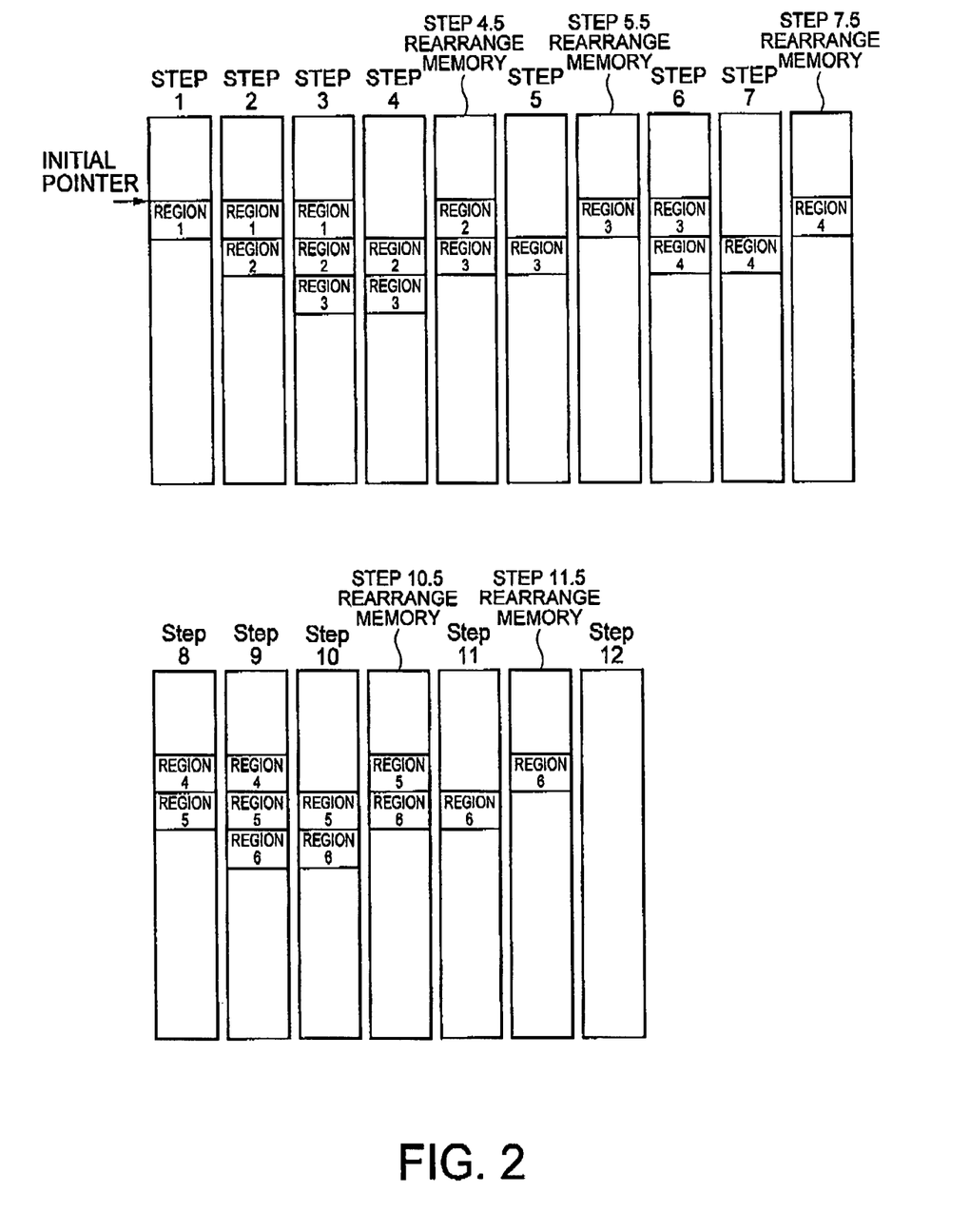
FIG. 2 is an explanatory view typically showing a configuration of a parameter table region in a memory holding the parameters and tables to correspond to each of images when a plurality of compressed image data files is decompressed in parallel.

FIG. 1 is an explanatory view typically showing the timings of securing and releasing memory areas for acquiring and holding the parameters and the tables to correspond to each of images when a plurality of compressed image data files is decompressed in parallel. FIG. 2 is an explanatory view typically showing the configuration of the memory areas secured and released to acquire and hold the parameters and the tables to correspond to each of images when a plurality of compressed image data files is decompressed in parallel.

It is assumed that one print page data file includes compressed image data files of six images 1, 2, 3, 4, 5, and 6, respectively. It is also assumed that the processing for decompressing the compressed image data files is performed for every raster from top to down in FIG. 1.

The compressed image data files included in the print page data file are sequentially searched for every print line position. At a step 1, the image 1 is discovered, and parameters and tables are acquired to correspond to the compressed image data file of the image 1. Furthermore, a region 1 for holding the parameters and the tables acquired to correspond to the compressed image data file of the image 1 is secured in a memory with a position of an initial pointer set as a starting point. From this moment, a processing for decompressing the compressed image data file of the image 1 starts.

Thereafter, the compressed image data files included in the print page data file are sequentially searched for every print line position. At a step 2, the image 2 is discovered, and parameters and tables are acquired to correspond to the compressed image data file of the image 2. Furthermore, a region 2 for holding the parameters and the tables acquired to correspond to the compressed image data file of the image 2 is secured in the memory with an end position of the holding region 1 of the parameters and the tables corresponding to the image 1 set as a starting point. From this moment, a processing for decompressing the compressed image data file of the image 2 starts.

Thereafter, the compressed image data flies included in the print page data file are sequentially searched for every print line position. At a step 3, the image 3 is discovered, and parameters and tables are acquired to correspond to the compressed image data file of the image 3. Furthermore, a region 3 for holding the parameters and the tables acquired to correspond to the compressed image data file of the image 3 is secured in the memory with an end position of the holding region 2 of the parameters and the tables corresponding to the image 2 set as a starting point. From this moment, a processing for decompressing the compressed image data file of the image 3 starts.

Thereafter, the compressed image data files included in the print page data file are sequentially searched for every print line position. At a step 4, the initial pointer reaches the end position of the image 1 and the processing for decompressing the compressed image data file of the image 1 ends. As a result, the parameters and the tables acquired to correspond to the compressed image data file of the image 1 become unnecessary. Therefore, the holding region 1 of the parameters and the tables acquired to correspond to the compressed image data file of the image 1 becomes unnecessary. The holding region 1 is released and the memory area for securing the holding region 1 becomes blank.

At a step 4.5, the memory area is rearranged. The holding region 2 of the parameters and the tables corresponding to the image 2 is secured with the position of the initial pointer as a starting point. The holding region 3 of the parameters and the tables corresponding to the image 3 is secured with the position of a new end position of the holding region 2 of the parameters and the tables corresponding to the image 2 as a starting point.

Thereafter, the compressed image data files included in the print page data file are sequentially searched for every print line position. At a step 5, the initial pointer reaches the end position of the image 2 and the processing for decompressing the compressed image data file of the image 2 ends. As a result, the parameters and the tables acquired to correspond to the compressed image data file of the image 2 become unnecessary. Therefore, the holding region 2 of the parameters and the tables acquired to correspond to the compressed image data file of the image 2 becomes unnecessary. The holding region 2 is released and the memory area for securing the holding region 2 becomes blank.

At a step 5.5, the memory area is rearranged. The holding region 3 of the parameters and the tables corresponding to the image 3 is secured with the position of the initial pointer as a starting point.

Thereafter, the compressed image data files included in the print page data file are sequentially searched for every print line position. At a step 6, the image 4 is discovered, and the parameters and the tables are acquired to correspond to the compressed image data file of the image 4. Furthermore, a region 4 for holding the parameters and the tables acquired to correspond to the compressed image data file of the image 4 is secured in the memory with an end position of the holding region 3 of the parameters and the tables corresponding to the image 3 set as a starting point. From this moment, a processing for decompressing the compressed image data file of the image 4 starts.

Thereafter, the compressed image data files included in the print page data file are sequentially searched for every print line position. At a step 7, the initial pointer reaches the end position of the image 3 and the processing for decompressing the compressed image data file of the image 3 ends. As a result, the parameters and the tables acquired to correspond to the compressed image data file of the image 3 become unnecessary. Therefore, the holding region 3 of the parameters and the tables acquired to correspond to the compressed image data file of the image 3 becomes unnecessary. The holding region 3 is released and the memory area for securing the holding region 3 becomes blank.

At a step 7.5, the memory area is rearranged. The holding region 4 of the parameters and the tables corresponding to the image 4 is secured with the position of the initial pointer as a starting point.

Thereafter, the compressed image data files included in the print page data file are sequentially searched for every print line position. At a step 8, the image 5 is discovered, and the parameters and the tables are acquired to correspond to the compressed image data file of the image 5. Furthermore, a region 5 for holding the parameters and the tables acquired to correspond to the compressed image data file of the image 5 is secured in the memory with an end position of the holding region 4 of the parameters and the tables corresponding to the image 4 set as a starting point. From this moment, a processing for decompressing the compressed image data file of the image 5 starts.

Thereafter, the compressed image data files included in the print page data file are sequentially searched for every print line position. At a step 9, the image 6 is discovered, and the parameters and the tables are acquired to correspond to the compressed image data file of the image 6. Furthermore, a region 6 for holding the parameters and the tables acquired to correspond to the compressed image data file of the image 6 is secured in the memory with an end position of the holding region 5 of the parameters and the tables corresponding to the image 5 set as a starting point. From this moment, a processing for decompressing the compressed image data file of the image 6 starts.

Thereafter, the compressed image data files included in the print page data file are sequentially searched for every print line position. At a step 10, the initial pointer reaches the end position of the image 4 and the processing for decompressing the compressed image data file of the image 4 ends. As a result, the parameters and the tables acquired to correspond to the compressed image data file of the image 4 become unnecessary. Therefore, the holding region 4 of the parameters and the tables acquired to correspond to the compressed image data file of the image 4 becomes unnecessary. The holding region 4 is released and the memory area for securing the holding region 4 becomes blank.

At a step 10.5, the memory area is rearranged. The holding region 5 of the parameters and the tables corresponding to the image 5 is secured with the position of the initial pointer as a starting point. The holding region 6 of the parameters and the tables corresponding to the image 6 is secured with the position of a new end position of the holding region 5 as a starting point.

Thereafter, the compressed image data files included in the print page data file are sequentially searched for every print line position. At a step 11, the initial pointer reaches the end position of the image 5 and the processing for decompressing the compressed image data file of the image 5 ends. As a result, the parameters and the tables acquired to correspond to the compressed image data file of the image 5 become unnecessary. Therefore, the holding region 5 of the parameters and the tables acquired to correspond to the compressed image data file of the image 5 becomes unnecessary. The holding region 5 is released and the memory area for securing the holding region 5 becomes blank.

At a step 11.5, the memory area is rearranged. The holding region 6 of the parameters and the tables corresponding to the image 6 is secured with the position of the initial pointer as a starting point.

Thereafter, the compressed image data files included in the print page data file are sequentially searched for every print line position. At a step 12, the initial pointer reaches the end position of the image 6 and the processing for decompressing the compressed image data file of the image 6 ends. As a result, the parameters and the tables acquired to correspond to the compressed image data file of the image 6 become unnecessary. Therefore, the holding region 6 of the parameters and the tables acquired to correspond to the compressed image data file of the image 6 becomes unnecessary. The holding region 6 is released and the memory area for securing the holding region 6 becomes blank.

In this manner, the processing for decompressing the respective compressed image data files of all the images is finished, and all the memory areas are released. Namely, the processing for decompressing the respective compressed image data files of the six images 1, 2, 3, 4, 5, and 6 included in the print page data file is finished.

In the example stated above, the six images 1, 2, 3, 4, 5, and 6 are arranged on one print page, and the number of holding regions of the parameters and the tables secured in the memory simultaneously is up to three. This means that the number of compressed image data files to be decompressed in parallel is up to three.

When a plurality of image data files included in the printed page data file as a printing subject, i.e., a plurality of compressed image data files to be subjected to the decompression processing prior to execution of printing is present, and those compressed image data files are decompressed in parallel using the hardware-based decompression processing technique, then overhead for loading in an SRAM, a register or the like such parameters as a file pointer and a rotation information map and such tables as the Huffman decompression table and the quantization table necessary to decompress the compressed image data files for every data file and switching decompression progress information is increased. The longer overhead makes it difficult to perform the hardware-based decompression processing at the higher processing rate than that of the software-based decompression processing.

As stated, the software-based decompression processing is generally lower in processing rate than the hardware-based decompression processing. However, when a plurality of compressed image data files as a decompression processing subject are present, that is, when the compressed image data files are switched over frequently, the software-based decompression processing can make such switching easily at high speed, as compared with the hardware-based decompression processing. As a result, the software-based decompression processing can be performed at a higher processing rate than that of the hardware-based decompression processing.

The image processing apparatus and the image processing method according to the embodiments of the present invention intend to accelerate the decompression processing rate of decompressing the image data file by basically performing the hardware-based decompression processing that can be performed at high processing rate in many cases, and performing the hardware-based decompression processing and the software-based decompression processing in parallel when a plurality of decompressed image data files as the decompression processing subject are present.

An example of ordinary image correction processing procedures including the processing for decompressing the compressed image data file will first be described.

Figure 3:
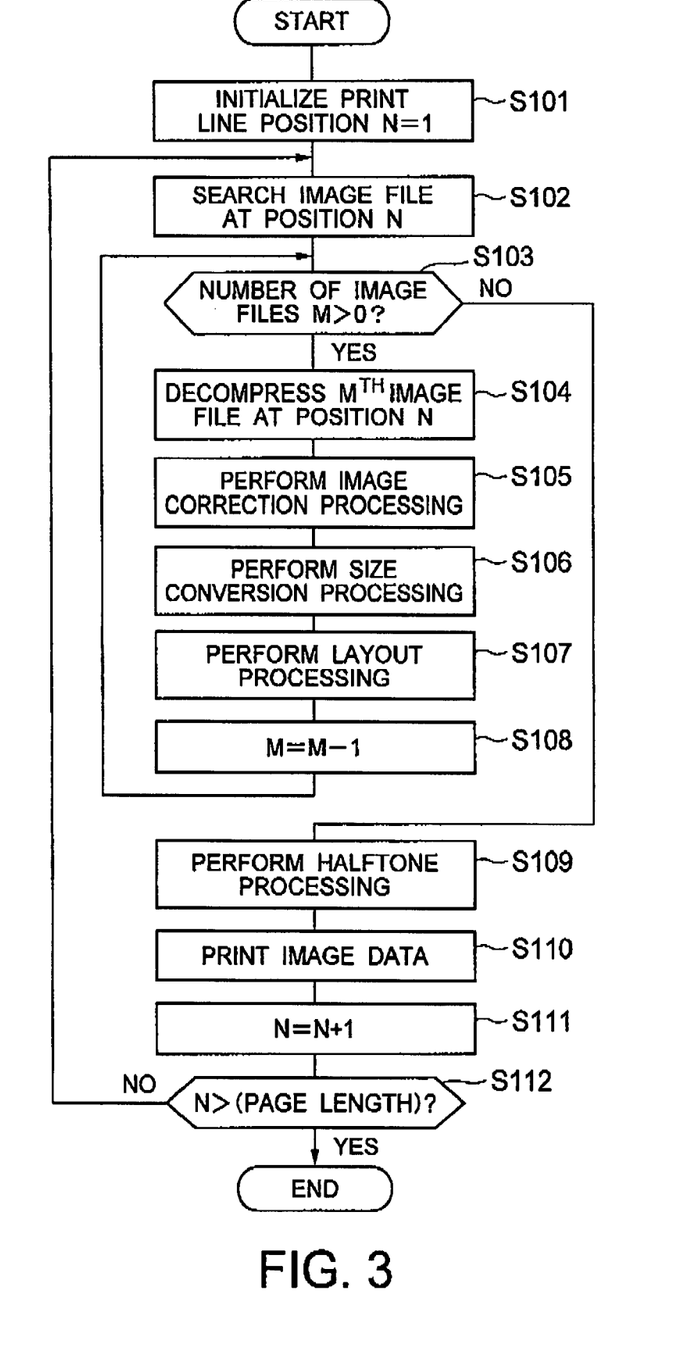
FIG. 3 is a flowchart showing an example of ordinary image correction processing procedures including the processing for decompressing the compressed image data file.

FIG. 3 is a flowchart showing an example of ordinary image correction processing procedures including the processing for decompressing the compressed image data file.

A print line position N is initialized and set to N=1 (step S101).

A compressed image data file included in a print page data file as a printing subject, i.e., a compressed image data file to be subjected to an image correction processing prior to execution of printing and to be subjected to the decompression processing prior to execution of the image correction processing is searched at the print line position N (hereinafter, "position N") of the print page data file (step S102).

If the number M of the compressed image data files that are discovered and are not decompressed yet is zero as a result of searching the compressed image data file at the position N ("No", step S103), there is no need to further perform a decompression processing at the position N. Therefore, the processing goes to processing procedures at a step of performing a halftone processing (step S109) to be described later and subsequent steps.

If the number M of the compressed image data files that are discovered and that are not decompressed yet is greater than zero (M>0) as a result of searching the compressed image data files at the position N ("Yes", step S103), that is, one or more compressed image data files that are not decompressed yet are present, an $M^{th}$ compressed image data file among the M compressed image data files that are discovered and that are not decompressed yet is decompressed at the position N (step S104).

As a method of the processing for decompressing the compressed image data file, the hardware-based decompression processing method and the software-based decompression processing method have been conventionally used independently of each other as already stated. These decompression processing methods and a decompression processing technique based on the image processing apparatus and the image processing method according to the embodiments of the present invention will be described later in detail.

When the hardware-based decompression processing method is used and a hardware-based image correction processing method is also used, the processing device (hardware) such as an ASIC or an arithmetic processing device (CPU) performs sampling and statistic value calculation on input image data to be decompressed based on a part of a function of a decompression processing program (software). Correction parameters for the correction processing on the image data are decided while being associated with respective grid points on a three-dimensional (3D) lookup table based on the result of the sampling and the statistic value calculation. The 3D lookup table constituted by the correction parameters is created in advance. The created 3D lookup table is stored in a storage device such as a RAM, an EEPROM or HDD. On the other hand, when the image compression processing is performed using the software, an image data correction processing program is stored In the storage device such as a ROM, a RAM, an EEPROM or HDD in advance.

Specific examples of the image data correction processing assumed herein could include the following three color correction processings: a tone curve correction processing performed according to a tone curve representing the tone relation between input image data (original image data) and output image data (corrected image data), a chroma correction processing for setting highlight degrees of respective colors of red (R), green (G), and blue (B), and a memory color correction processing for making the colors closer to ideal colors which a person feels beautiful when he or she looks at the colors, that is, memory colors.

After the decompression processing on the $M^{th}$ compressed image data file at the position N is finished, the image data corresponding to the $M^{th}$ compressed image data file is subjected to the correction processing (step S105). The image data correction processing is either a hardware-based correction processing using the 3D lookup table and interpolation operation or a software-based sequential correction processing.

In the hardware-based image data correction processing, the processing device (hardware) such as the ASIC or the CPU accesses the storage device. Furthermore, the processing device (hardware) performs an arithmetic processing including an interpolation operation with respect to the respective points of the input image data using the 3D lookup table ("3D-LUT") stored in the storage device. The processing device (hardware) thereby sequentially outputs output image data that are to constitute print image data.

It is to be noted that the hardware-based image data correction processing using the arithmetic processing including the interpolation operation is to collectively perform color correction processings such as the tone curve correction, the chroma correction, and the memory color correction by the arithmetic processing including the interpolation operation.

On the other hand, in the software-based image data sequential correction processing, a correction processing program stored in the storage device is read and executed. The input image data is thereby corrected and the output image data that is to constitute the print image data is sequentially output.

As stated, after the hardware-based or software-based image data correction processing is finished, a size conversion processing for converting the image size into an image size at which an actual printing is executed (step S106), and a layout processing for arranging the images according to a set layout (step S107) are sequentially executed for the output image data as the print image data.

A value of the number M of compressed image data files that are discovered and that are not decompressed as a result of searching the compressed image data file at the position N at the step S102 is decremented by one, i.e., M=M−1 as the number of compressed image data files to be subsequently decompressed (step S108). The processing returns to the step S103.

At the step S103, if the number M of compressed image data files that are not decompressed yet is still greater than zero (M>0) after the value of M is decremented to M−1, that is, one or more compressed image data files are still not decompressed ("Yes", step S103), the $M^{th}$ compressed image data file among the M compressed image data files that are discovered and that are not decompressed yet is decompressed at the position N (step S104). Furthermore, the image data correction processing (step S105), the size conversion processing (step S106), the layout processing (step S107), and decrementing of the value of M by one, i.e., M=M−1 (step S108) are sequentially executed.

On the other hand, after the value of M is decremented by one and set to M=M−1, it is determined again whether the number M of compressed image data files that are not decompressed yet is zero. If it is determined that the number M is zero ("No", step S103), there is no need to further decompress the compressed image data files at the print line position N. Therefore, the processing goes to processing procedures at the step of performing the halftone processing (step S109) and the subsequent steps.

Namely, the halftone processing for converting a tone of each image into a tone at a gradient which the printer can deal with is performed (step S109). Final print image data that can be actually printed is output and printed (step S110).

Thereafter, a value of the print line position N of the print page file at which the image data files are searched is incremented by one and set to N=N+1 (step S111). If the value of the position N after the increment does not exceed a length of a page to be printed ("No", step S112), the processing returns to the step S102 and the processing procedures at the step S102 and the subsequent steps are similarly repeated.

The one example of the ordinary image correction processing procedures including the processing for decompressing the compressed image data files are thus completed.

Next, the procedures for the decompression processing on the compressed image data files that are discovered and that are not decompressed yet as a result of searching the compressed image data files at the position N based on various methods, that is, a specific content of the above-mentioned step S104 will be described.

As a method of the processing for decompressing the compressed image data file, the hardware-based decompression processing method and the software-based decompression processing method have been conventionally used independently of each other as already stated.

An example of processing procedures for the software-based decompression processing method and an example of processing procedures for the hardware-based decompression processing method will be described respectively in sequence.

Figure 4:
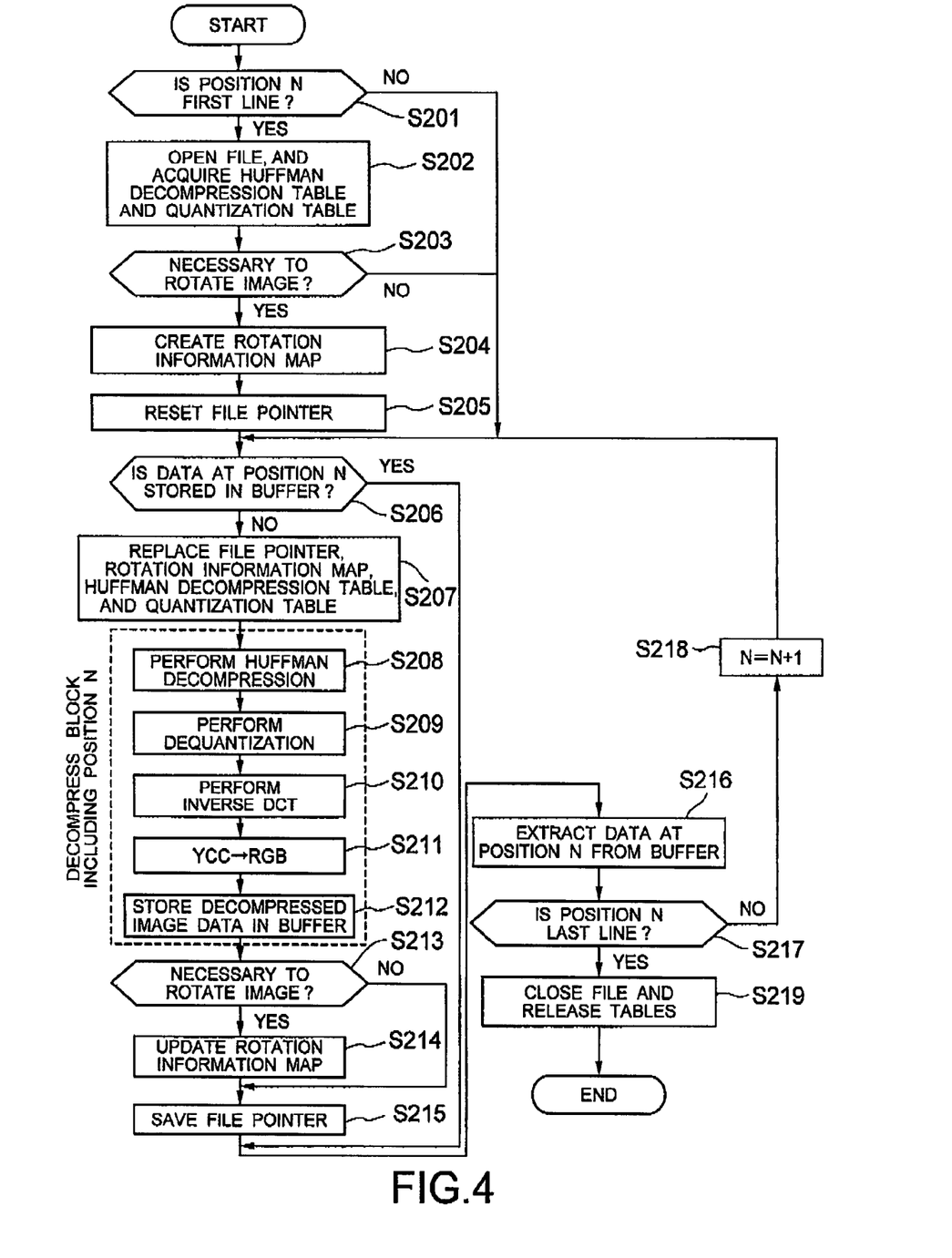
FIG. 4 is a flowchart showing an example of processing procedures for the software-based decompression processing method.

FIG. 4 is a flowchart showing an example of processing procedures for the software-based decompression processing method.

When a compressed image data file is discovered at the print line position N of the print page data file as a subject for searching the compressed image data file (see steps S102 and S103 in the flowchart shown in FIG. 3), it is determined whether the position N at which the search is conducted is a first line position of the compressed image data file (step S201).

If the print line position N at which the search is conducted is the first line position of the compressed image data file ("Yes", step S201), then the compressed image data file is opened, the Huffman decompression table and the quantization table for the decompression processing is acquired to correspond to the compressed image data file (step S202).

In the flowchart of FIG. 4, it is assumed that an image data compression scheme is JPEG (Joint Photographic Experts Group) by way of example.

Therefore, after acquiring the tables for the decompression processing, it is determined whether it is necessary to rotate the image corresponding to the compressed image data file by 90 degrees (step S203).

If it is determined that it is necessary to rotate the image ("Yes", step S203), a rotation information map is created (step S204).

The steps S203 and S204 are a preprocessing of a processing for rotating the image by 90 degrees at subsequent steps S213 and S214, and executed uniquely if the image data compression scheme is JPEG.

Accordingly, if the image data compression scheme is not JPEG, the steps S203 and S204 and the subsequent steps S213 and S214 are not executed.

Generally, the decompression processing is not performed once on all compressed image data included in the compressed image data file. The compressed image data is divided into some portions, i.e., the compressed image data is divided by, for example, every print line position, and the decompression processing is performed for every divided segment.

Due to this, the file pointer indicating up to which segment of the compressed image data file the decompression processing has been finished is used and recorded. Therefore, before starting the subsequent decompression processing on the compressed image data file, the file pointer is reset (step S205).

On the other hand, if the position N at which the search is conducted is not the first line position of the compressed image data file ("No", step S201), then the compressed image data file is already opened and the Huffman decompression table and the quantization table for the decompression processing are already acquired to correspond to the compressed image data file (step S202), it is already determined whether it is necessary to rotate the image (step S203), the rotation information map is already created if it is necessary to rotate the image (step S204), and the file pointer indicating up to which segment of the compressed image data file the decompression processing has been finished is already reset (step S205). Therefore, the processing goes to the subsequent step S206.

Then, it is determined whether decompressed image data at the position N is stored in a buffer (step S206).

The buffer may be included in the processing device such as the CPU or may be another storage device.

If it is determined that decompressed image data at the position N is already stored in the buffer ("Yes", S206), there is no need to decompress the image data at the position N. The processing goes to a procedure at a step S216. The image data at the print line position N as a correction processing subject is extracted from the buffer (step S216), and the processing goes to the procedures at the step S105 and the subsequent steps in the flowchart shown in FIG. 3.

If the decompressed image data at the position N is not stored in the buffer ("No", S216), the file pointer, the rotation Information map, the Huffman decompression table, and the quantization table are replaced by those corresponding to the compressed image data file as a present processing subject (step S217). The replacement is a procedure on the assumption that a plurality of compressed image data files may be decompressed in parallel.

Thereafter, using the Huffman decompression table and the quantization table corresponding to the compressed image data file as the present processing subject, the compressed image data at the position N is subjected to Huffman decompression (step S208), dequantization (step S209), inverse DCT (discrete cosine transform) (step S210), and YCC-RGB color conversion (step S211).

After the compressed image data at the position N is decompressed as described above, the decompressed image data is stored in the buffer (step S212).

Furthermore, it is determined whether it is necessary to rotate the image by 90 degrees (step S213).

If it is determined that it is necessary to rotate the image ("Yes", step S213), then the image is rotated, and the rotation information map already created as the preprocessing at the step S204 is updated (step S214).

Similarly to the steps S203 and S204, the steps S213 and S214 are executed uniquely if the image data compression scheme is JPEG. Accordingly, if the image data compression scheme is not JPEG, the steps S213 and S214 are not executed.

Thereafter, the file pointer indicating up to which segment of the image data file the decompression has been performed is saved (step S215).

The decompressed image data at the print line position N as the correction processing subject is extracted from the buffer (step S216). For the decompressed image data, the processing goes to the procedures at the step S105 and the following steps in the flowchart shown in FIG. 3.

In the processing procedures in the flowchart of FIG. 4, it is determined whether the position N at which the decompression processing on the compressed image data file has been finished is a last print line position of the compressed image data file (step S217). If the print line position N is not the last print line position of the compressed image data file ("No", step S217), the value of N is incremented by one and set to N=N+1 (step S218). The processing returns to the step S206 and the operation procedure at the step S206 and the following steps are repeated.

If the position N at which the decompression processing on the compressed image data file has been finished is the last print line position of the compressed image data file ("Yes", step S217), then the compressed image data file is closed and the Huffman decompression table and the quantization table corresponding to the compressed image data file and acquired for the decompression processing are released (step S219).

In this manner, the one example of the processing procedures for the software-based decompression processing method has been finished.

Figure 5:
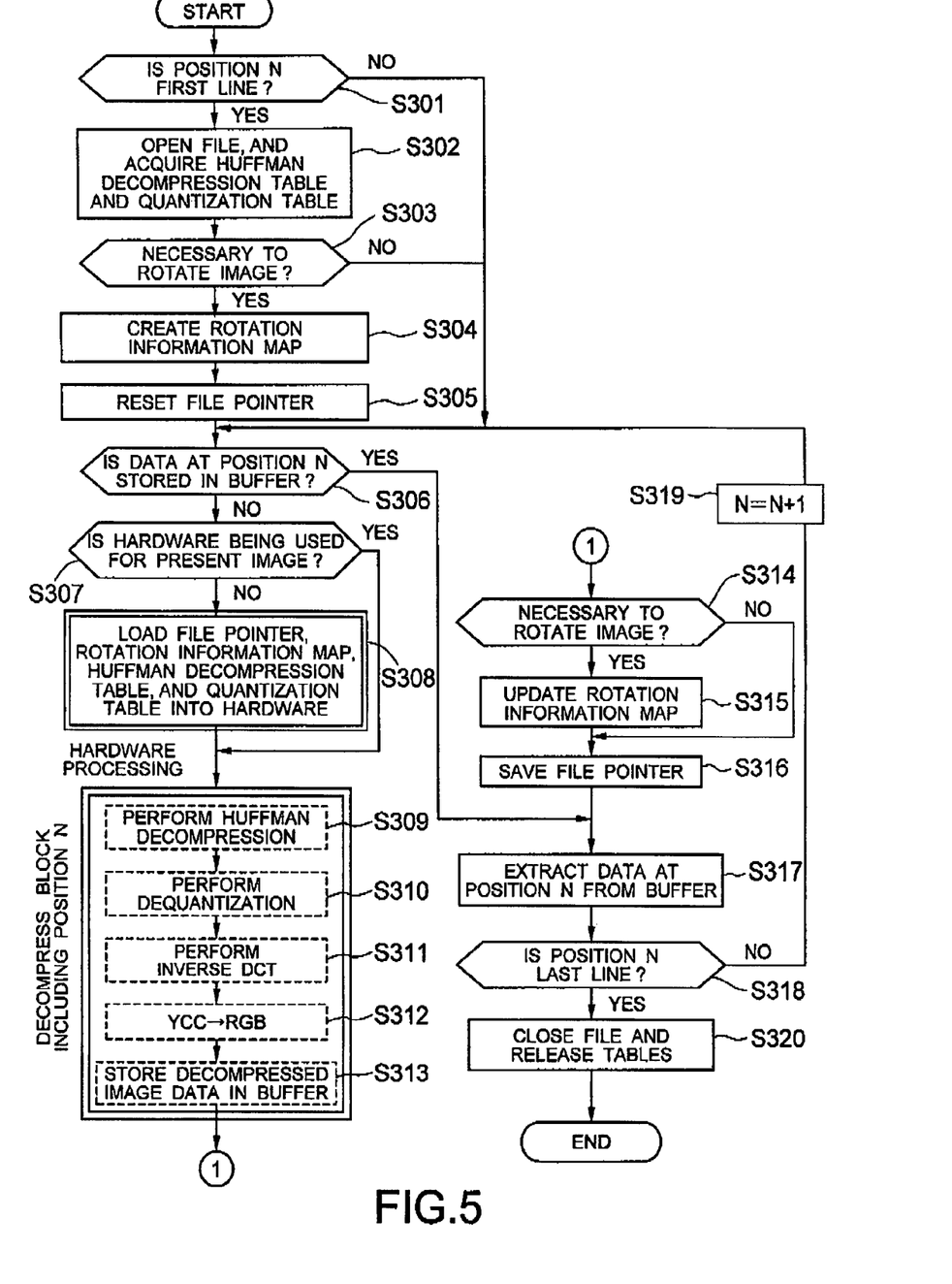
FIG. 5 is a flowchart showing an example of processing procedures for the hardware-based decompression processing method.

FIG. 5 is a flowchart showing an example of processing procedures for the hardware-based decompression processing method.

When a compressed image data file is discovered at the print line position N of the print page data file as a subject for searching the compressed image data file (see steps S102 and S103 in the flowchart shown in FIG. 3), it is determined whether the position N at which the search is conducted is a first line position of the compressed image data file (step S301).

If the print line position N at which the search is conducted is the first line position of the compressed image data file ("Yes", step S301), then the compressed image data file is opened, the Huffman decompression table and the quantization table for the decompression processing are acquired to correspond to the compressed image data file (step S302).

In the flowchart of FIG. 5, similarly to that shown in FIG. 4, it is assumed that an image data compression scheme is JPEG by way of example.

Therefore, after acquiring the tables for the decompression processing, it is determined whether it is necessary to rotate the image corresponding to the compressed image data file by 90 degrees (step S303).

If it is determined that it is necessary to rotate the image ("Yes", step S303), a rotation information map is created (step S304).

The steps S303 and S304 are a preprocessing of a processing for rotating the image by 90 degrees at subsequent steps S314 and S315, and executed uniquely if the image data compression scheme is JPEG.

Accordingly, if the image data compression scheme is not JPEG, the steps S303 and S304 and the subsequent steps S314 and S315 are not executed.

Before starting the subsequent decompression processing on the compressed image data file, the file pointer indicating up to which segment of the compressed image data file the decompression processing has been finished is reset (step S305).

On the other hand, if the position N at which the search is conducted is not the first line position of the compressed image data file ("No", step S301), then the compressed image data file is already opened and the Huffman decompression table and the quantization table for the decompression processing are already acquired to correspond to the compressed image data file (step S302), it is already determined whether it is necessary to rotate the image (step S303), the rotation information map is already created if it is necessary to rotate the image (step S304), and the file pointer indicating up to which segment of the compressed image data file the decompression processing has been finished is already reset (step S305). Therefore, the processing goes to the subsequent step S306.

It is determined whether decompressed image data at the position N is stored in a buffer (step S306).

The buffer may be included in the processing device such as the CPU or may be another storage device.

If it is determined that decompressed image data at the position N is already stored in the buffer ("Yes", S306), there is no need to decompress the image data at the position N. The processing goes to a procedure at a step S317. The image data at the print line position N as a correction processing target is extracted from the buffer (step S317), and the processing goes to the procedures at the step S105 and the subsequent steps shown in FIG. 3.

If no decompressed image data at the print line position N is stored in the buffer ("No", S306), it is determined whether the processing device (hardware) such as the ASIC or the arithmetic processing device (CPU) is being used for the compressed image data file as a present processing subject (step S307).

If the processing device (hardware) is not being used for the compressed image data file as the present processing subject ("No", step S307), the Huffman decompression table and the quantization table acquired to correspond to the compressed image data file as the present processing subject, the reset file pointer, and the created rotation information map are loaded into the processing device (hardware) such as the ASIC or the CPU (step S308). The loading of the file pointer, the rotation information map, the Huffman decompression table, and the quantization table into the processing device is a procedure on the assumption that a plurality of compressed image data files is decompressed in parallel.

If the processing device (hardware) such as the ASIC or the CPU is being used for the compressed image data file as the present processing target ("Yes", step S307), the Huffman decompression table and the quantization table acquired to correspond to the compressed image data file as the present processing subject, the reset file pointer, and the created rotation information map are already loaded into the processing device (hardware). Therefore, the processing goes to a step S309 and subsequent steps.

Thereafter, using the Huffman decompression table and the quantization table corresponding to the compressed image data file as the present processing subject, the compressed image data at the position N is subjected to Huffman decompression (step S309), dequantization (step S310), inverse DCT (step S311), and YCC-RGB color conversion (step S312).

After the compressed image data at the position N is decompressed, the decompressed image data is stored in the buffer (step S313).

Furthermore, it is determined whether it is necessary to rotate the image by 90 degrees (step S314).

If it is determined that it is necessary to rotate the image ("Yes", step S314), then the image is rotated, and the rotation information map already created as the preprocessing at the step S304 is updated (step S315).

Similarly to the steps S303 and S304, the steps S314 and S315 are executed uniquely if the image data compression scheme is JPEG. Accordingly, if the image data compression scheme is not JPEG, the steps S314 and S315 are not executed.

Thereafter, the file pointer indicating up to which segment of the image data file the decompression has been performed is saved (step S316).

The decompressed image data at the N as the correction processing subject is extracted from the buffer (step S317). For the decompressed image data, the processing goes to the procedures at the step S105 and the subsequent steps in the flowchart of FIG. 3.

In the processing procedures in the flowchart of FIG. 5, it is determined whether the position N at which the decompression processing on the compressed image data file has been finished is a last print line position of the compressed image data file (step S318), if the print line position N is not the last print line position of the compressed image data file ("No", step S318), the value of N is incremented by one and set to N=N+1 (step S319). The processing returns to the step S306 and the operation procedure at the step S306 and the following steps are repeated.

If the position N at which the decompression processing on the compressed image data file has been finished is the last print line position of the compressed image data file ("Yes", step S318), then the compressed image data file is closed and the Huffman decompression table and the quantization table corresponding to the compressed image data file and acquired for the decompression processing are released (step S320).

In this manner, the one example of the processing procedures for the hardware-based decompression processing method have been finished.

As stated above, the software-based decompression processing method and the hardware-based decompression processing method have both merits and demerits. As long as one of the decompression processing methods is selectively used, it is difficult to realize high-rate decompression processing in whichever case.

Considering these, in the image processing apparatus and the image processing method according to the embodiments of the present invention, the hardware-based decompression processing is basically performing for decompressing the compressed image data, and the hardware-based decompression processing and a software-based decompression processing are performed in parallel when a plurality of compressed image data files are present as the decompression processing subject. By doing so, it is possible to accelerate the decompression processing rate for decompressing the compressed image data files and to realize the high-rate decompression processing in every case.

Procedures of a processing for decompressing a compressed image data file according to one embodiment of the present invention will be described with reference to FIGS. 6 and 7.

Figure 6:
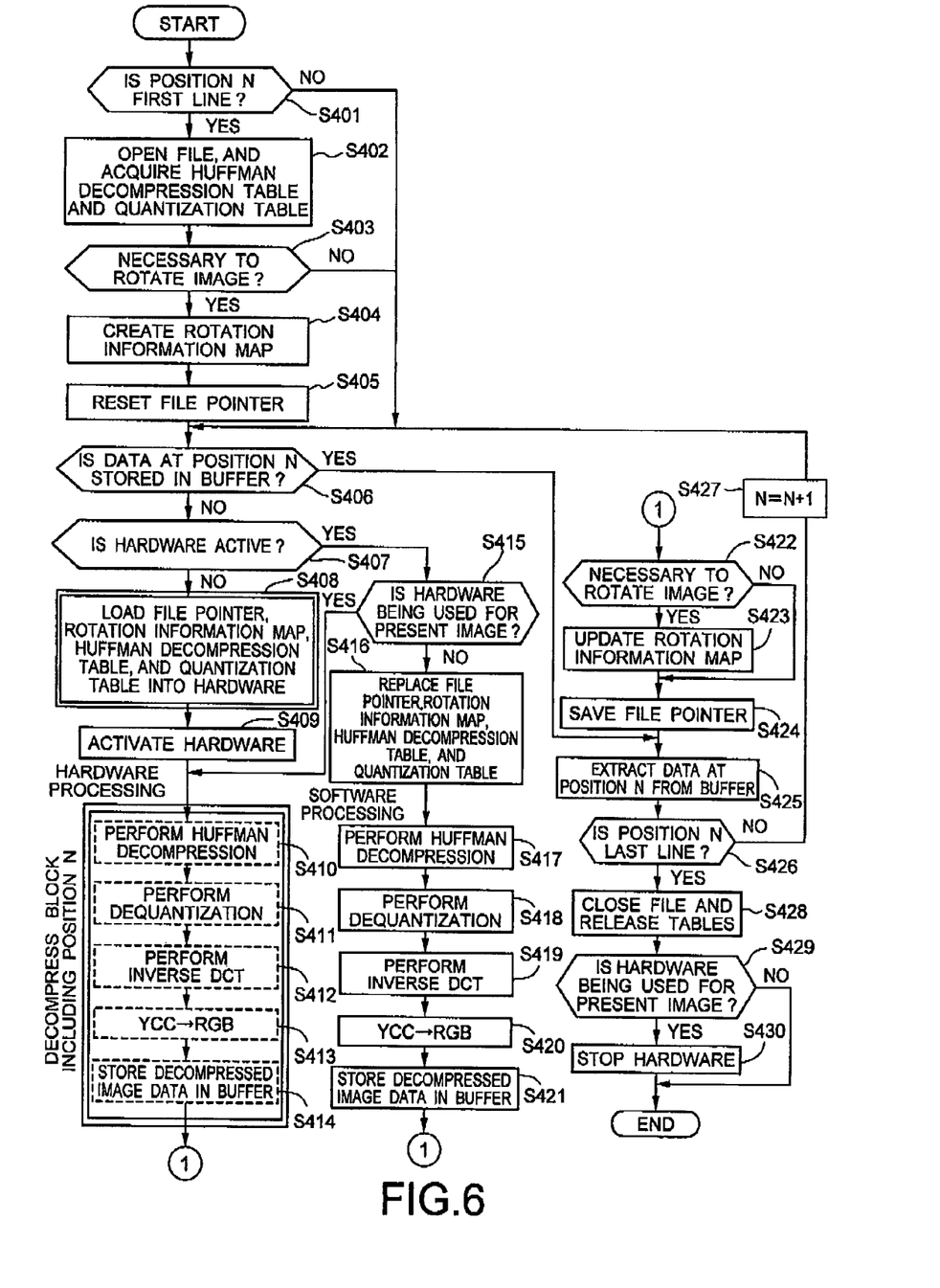
FIG. 6 is a flowchart showing procedures of a processing for decompressing compressed image data files according to one embodiment of the present invention.

FIG. 6 is a flowchart showing procedures of a processing for decompressing compressed image data files according to one embodiment of the present invention. FIG. 7 is a block diagram showing a configuration of an image processing apparatus according to the embodiment of the present invention.

Figure 7:
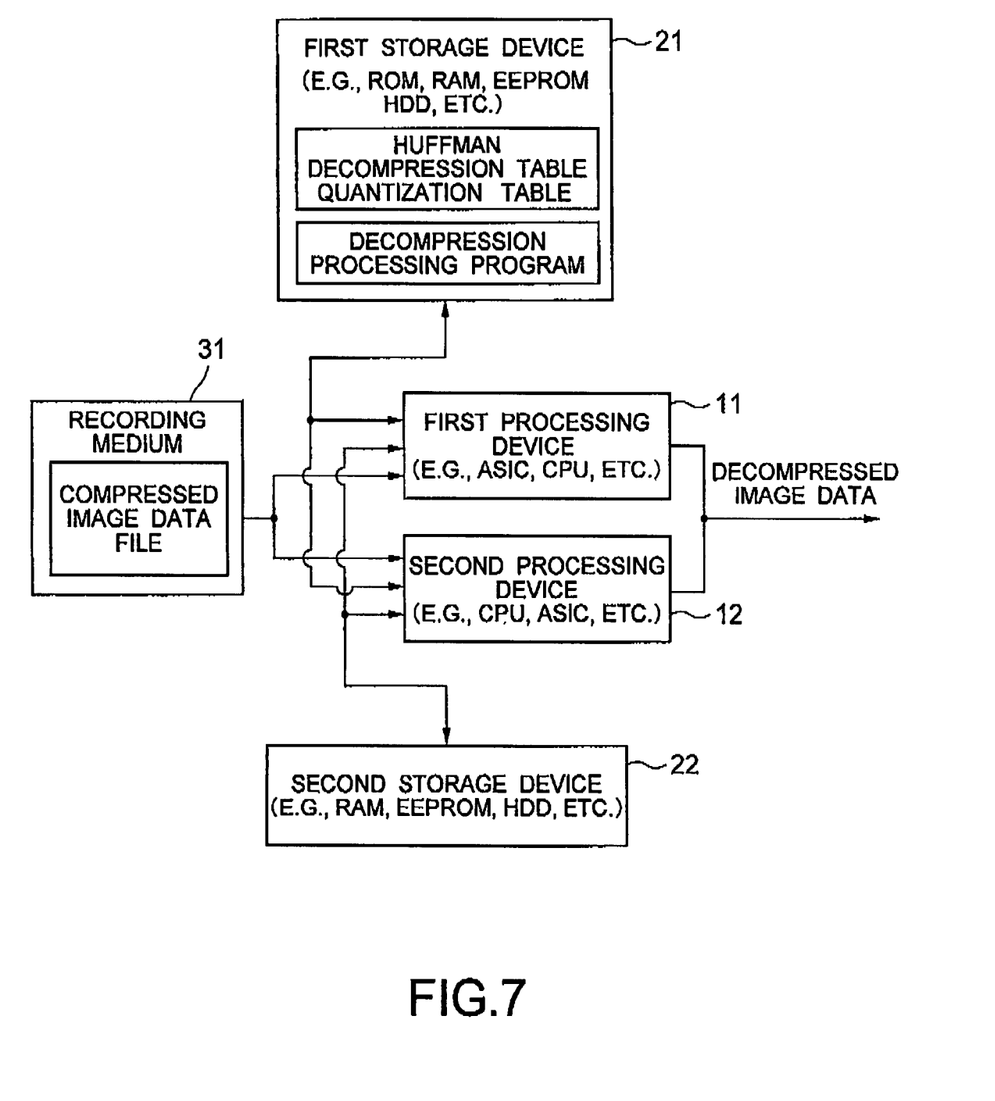
FIG. 7 is a block diagram showing a configuration of an image processing apparatus according to the embodiment of the present invention.

As shown in FIG. 7, an image processing apparatus according to the embodiment of the present invention comprises: a first storage device 21, e.g., a ROM, a RAM, an EEPROM or an HDD, storing therein a plurality of tables including a Huffman decompression table and a quantization table necessary to decompress a compressed image data file, and storing therein a decompression processing program for decompressing the compressed image data file; a second storage device 22, e.g., a RAM, an EEPROM or an HDD, storing therein a plurality of parameters including a rotation information map and a file pointer created and updated while the compressed image data file is being decompressed; a first processing device 11 acquiring and loading the tables including the Huffman decompression table and the quantization table stored in the first storage device 21 and the parameters including the rotation information map and the file pointer stored in the second storage device 22, and decompressing the compressed image data file; and a second processing device 12 reading and executing the decompression processing program stored in the first storage device 21, and acquiring and reading the tables including the Huffman decompression table and the quantization table stored in the first storage device 21 and the parameters including the rotation information map and the file pointer stored in the second storage device 22, thereby decompressing the compressed image data file, wherein one of the compressed image data files is decompressed by the first processing device 11, and remaining compressed image data files are decompressed by the second processing device 12 when a plurality of compressed image data files is decompressed by a parallel processing.

Furthermore, an image processing method according to the embodiment of the present invention is an image processing method comprising: a first processing step of acquiring and loading a plurality of tables including a Huffman decompression table and a quantization table necessary to decompress a compressed image data file from a first storage device 21 storing therein the tables and a decompression processing program for decompressing the compressed image data file, and acquiring and loading a plurality of parameters including a rotation information map and a file pointer created and updated while the compressed image data file is being decompressed from a second storage device 22 storing therein the parameters, and decompressing the compressed image data file; and a second processing step reading and executing the decompression processing program stored in the first storage device 21, and acquiring and reading the tables including the Huffman decompression table and the quantization table stored in the first storage device 21 and the parameters including the rotation information map and the file pointer stored in the second storage device 22, thereby decompressing the compressed image data file, wherein the first processing step and the second processing step are used in parallel, and one of the compressed image data files is decompressed at the first processing step, and remaining compressed image data files are decompressed at the second processing step when a plurality of compressed image data files is decompressed by a parallel processing.

The compressed image data file as the decompression processing subject is stored in a recording medium 31 such as a memory card, a microdrive, a CD-R or a DVD-R, and read by and input to one of or both of the first processing device 11 and the second processing device 12.

In the embodiment, it is assumed that the first processing device 21 is a processing device acquiring and loading the tables including the Huffman decompression table and the quantization table stored in the first storage device 21 and the parameters including the rotation information map and the file pointer stored in the second storage device 22, and decompressing the compressed image data file, that is, a processing device responsible for the hardware-based decompression processing.

It is also assumed that the second processing device 12 is a processing device reading and executing the decompression processing program stored in the first storage device 21, and acquiring and reading the tables including the Huffman decompression table and the quantization table stored in the first storage device 21 and the parameters including the rotation information map and the file pointer stored in the second storage device 22, thereby decompressing the compressed image data file, that is, a processing device responsible for the software-based decompression processing.

The first processing device 11 and the second processing device 12 may be either different processing devices or the same processing device.

Likewise, the first storage device 21 and the second storage device 22 may be either different storage devices or the same storage device.

Specific decompression processing procedures for decompressing compressed image data files for the image processing apparatus and the image processing method according to the embodiment of the present invention will be described with reference to FIG. 6.

When a compressed image data file is discovered at the position N of a print page data file as a subject or a target for searching the compressed image data file (see steps S102 and S103 in the flowchart shown in FIG. 3), it is determined whether the position N at which the search is conducted is a first line position of the compressed image data file (step S401).

If the print line position N at which the search is conducted is the first line position of the compressed image data file ("Yes", step S401), then the compressed image data file is opened, the Huffman decompression table and the quantization table for the decompression processing is acquired to correspond to the compressed image data file (step S402).

In the flowchart of FIG. 6, similarly to the flowcharts of FIGS. 4 and 5, it is assumed that an image data compression scheme is JPEG by way of example.

Therefore, after acquiring the tables for the decompression processing, it is determined whether it is necessary to rotate the image corresponding to the compressed image data file by 90 degrees (step S403).

If it is determined that it is necessary to rotate the image ("Yes", step S403), a rotation information map is created (step S404).

The steps S403 and S404 are a preprocessing of a processing for rotating the image by 90 degrees at subsequent steps S422 and S423, and executed uniquely if the image data compression scheme is JPEG.

Accordingly, if the image data compression scheme is not JPEG, the steps S403 and S404 and the subsequent steps S422 and S423 are not executed.

Before starting the subsequent decompression processing on the compressed image data file, the file pointer indicating up to which segment of the compressed image data file the decompression processing has been finished is reset (step S405).

On the other hand, if the position N at which the search is conducted is not the first line position of the compressed image data file ("No", step S401), then the compressed image data file is already opened and the Huffman decompression table and the quantization table for the decompression processing are already acquired to correspond to the compressed image data file (step S402), it is already determined whether it is necessary to rotate the image (step S403), the rotation information map is already created if it is necessary to rotate the image (step S404), and the file pointer Indicating up to which segment of the compressed image data file the decompression processing has been finished is already reset (step S405). Therefore, the processing goes to the subsequent step S406.

It is determined whether decompressed image data at the position N is stored in a buffer (step S406).

The buffer may be included in the first processing device 11 or the second processing device 12 or may be the first storage device 21 or the second storage device 22.

If it is determined that decompressed image data at the position N is already stored in the buffer ("Yes", S406), there is no need to decompress the image data at the position N.

The processing goes to a procedure at a step S425. The image data at the print line position N as a correction processing subject or target is extracted from the buffer (step S425), and the processing goes to the procedures at the step S105 and the subsequent steps in the flowchart shown in FIG. 3.

If the decompressed image data at the position N is not stored in the buffer ("No", S406), it is determined whether the first processing device 11 responsible for the hardware-based decompression processing is currently active (step S407). The reason for determining whether the first processing device 11 responsible for the hardware-based decompression processing is currently active is as follows. In case of the image processing apparatus and the image processing method according to the embodiment of the present invention, a plurality of compressed image data files are decompressed in parallel by performing thereon the hardware-based decompression processing and the software-based decompression processing. Due to this, after starting processing procedures of the decompression processing, the first processing device 11 responsible for the hardware-based decompression processing is not necessarily always active.

If the first processing device 11 responsible for the hardware-based decompression processing is not currently active ("No", S407), the Huffman decompression table and the quantization table acquired to correspond to the compressed image data file as the present processing subject or target, the reset file pointer, and the created rotation information map are loaded into the first processing device 11 (step S408), and the first processing device 11 is started (step S409). The loading of the file pointer, the rotation information map, the Huffman decompression table, and the quantization table into the first processing device 11 is a procedure on the assumption that a plurality of compressed image data files are decompressed in parallel.

If the first processing device 11 responsible for the hardware-based decompression processing is currently active ("Yes", S407), it is determined whether the first processing device 11 responsible for the hardware-based decompression processing is being used for the compressed image data file as a present processing subject or target (step S415).

If the first processing device 11 is being used for the compressed image data file as the present processing subject or target ("Yes", step S415), the Huffman decompression table and the quantization table acquired to correspond to the compressed image data file as the present processing subject or target, the reset file pointer, and the created rotation information map are already loaded into the first processing device 11. Therefore, the processing goes to a step S410 and subsequent steps.

Namely, using the Huffman decompression table and the quantization table corresponding to the compressed image data file as the present processing subject or target, the compressed image data at the position N is subjected to Huffman decompression (step S410), dequantization (step S411), inverse DCT (step S412), and YCC-RGB color conversion (step S413).

After the compressed image data at the position N is decompressed, the decompressed image data is stored in the buffer (step S414).

Furthermore, it is determined whether it is necessary to rotate the image by 90 degrees (step S422).

If it is determined that it is necessary to rotate the image ("Yes", step S422), then the image is rotated, and the rotation information map already created as the preprocessing at the step S404 is updated (step S423).

Similarly to the steps S403 and S404, the steps S422 and S423 are executed uniquely if the image data compression scheme is JPEG. Accordingly, if the image data compression scheme is not JPEG, the steps S422 and S423 are not executed.

Thereafter, the file pointer indicating up to which segment of the image data file the decompression has been performed is saved (step S424).

The decompressed image data at the N as the correction processing target is extracted from the buffer (step S425). For the decompressed image data, the processing goes to the procedures at the step S105 and the subsequent steps in the flowchart of FIG. 3.

On the other hand, if the first processing device 11 responsible for the hardware-based decompression processing is determined to be currently active at the step S407 ("Yes", S407), and is determined to be being unused for the compressed image data file as the present processing subject or target at the step S415 ("No", S415), this means that the first processing device 11 is being used for the other compressed image data file. This is because the image processing apparatus and the image processing method according to the embodiment of the present invention is provided on the assumption that a plurality of compressed image data files are decompressed in parallel.

If the decompression processing is to be performed on the compressed image data file as the present processing subject or target using the first processing device 11 that is being used for the other compressed image data file, then overhead for loading the tables including the Huffman decompression table and the quantization table necessary for the decompression processing for every compressed image data file and for replacing decompression progress information is increased. The longer overhead makes it difficult to perform the hardware-based decompression processing at the higher processing rate than that of the software-based decompression processing.

Considering the disadvantage, in case of the image processing apparatus and the image processing method according to the embodiment of the present invention, the decompression processing is not performed on the compressed image data file as the present processing subject or target using the first processing device 11 that is being used for the other compressed image data file. Instead, the compressed image data file as the present processing subject or target is decompressed using the software-based decompression processing in parallel to the other compressed image data file. It is thereby possible to accelerate the decompression processing rate for each compressed image data file.

According to the embodiment, therefore, if the first processing device 11 responsible for the hardware-based decompression processing is determined to be currently active at the step S407 ("Yes", S407), and is determined to be being unused for the compressed image data file as the present processing subject or target at the step S415 ("No", S415), the second processing device 12 that has been set active by reading in advance the decompression processing program stored in the first storage device 21 replaces the file pointer, the rotation information map, the Huffman decompression table, and the quantization table by those corresponding to the compressed image data file as the present processing subject or target based on the function of the decompression processing program (step S416). The replacement is a procedure on the assumption that a plurality of compressed image data files may be decompressed in parallel.

Thereafter, using the Huffman decompression table and the quantization table corresponding to the compressed image data file as the present processing subject or target, the compressed image data at the position N is subjected to Huffman decompression (step S417), dequantization (step S418), inverse DCT (step S419), and YCC-RGB color conversion (step S420).

After the compressed image data at the position N is decompressed, the decompressed image data is stored in the buffer (step S421).

Furthermore, it is determined whether it is necessary to rotate the image by 90 degrees (step S422).

If it is determined that it is necessary to rotate the image ("Yes", step S422), then the image is rotated, and the rotation information map already created as the preprocessing at the step S404 is updated (step S423).

Similarly to the steps S403 and S404, the steps S422 and S423 are executed uniquely if the image data compression scheme is JPEG. Accordingly, if the image data compression scheme is not JPEG, the steps S422 and S423 are not executed.

Thereafter, the file pointer indicating up to which segment of the image data file the decompression has been performed is saved (step S424).

The decompressed image data at the print line position N as the correction processing subject or target is extracted from the buffer (step S425). For the decompressed image data, the processing goes to the procedures at the step S105 and the following steps in the flowchart shown in FIG. 3.

In the processing procedures in the flowchart of FIG. 6, it is determined whether the position N at which the decompression processing on the compressed image data file has been finished is a last print line position of the compressed image data file. (step S426). If the print line position N is not the last print line position of the compressed image data file ("No", step S426), the value of N is incremented by one and set to N=N+1 (step S427). The processing returns to the step S406, and the operation procedure at the step S406 and the following steps are repeated.

If the position N at which the decompression processing on the compressed image data file has been finished is the last print line position of the compressed image data file ("Yes", step S426), then the compressed image data file is closed and the Huffman decompression table and the quantization table corresponding to the compressed image data file and acquired for the decompression processing in the first processing device 11 and the second processing device 12 are released (step S428).

After the step S428, it is determined whether the first processing device 11 responsible for the hardware-based decompression processing is being used for the compressed image data file as the processing subject or target (step S429). If the first processing device 11 is being used for the compressed image data file as the processing subject or target ("Yes", step S429), then the first processing device 11 is deactivated (step S430), and all the processing procedures for the decompression processing on one compressed image data file are finished.

In this manner, the one example of the specific decompression processing procedures for decompressing the compressed image data files for the image processing apparatus and the image processing method according to the embodiment of the present invention are finished.

In the image processing apparatus and the image processing method according to the embodiment of the present invention, the hardware-based decompression processing is basically performing for decompressing the compressed image data, and the hardware-based decompression processing and a software-based decompression processing are performed in parallel if a plurality of compressed image data files are present as the decompression processing subject or target, thereby, it is possible to accelerate the decompression processing rate for decompressing the compressed image data file and to realize the high-rate decompression processing in every case.

As a consequence, even if a plurality of image data files are allocated, it is possible to shorten time of expanding the image data files. In the standalone printer that is unconnected to the computer, it is possible to reduce printing time, and it is possible to realize cost reduction since the processing device can attain predetermined throughput even if the processing device is a low-performance processing device.

Finally, outline of procedures for an image data processing when a plurality of image data files A, B, C, . . . are included in an area corresponding to one page of a print page data file to be printed and when the printing is performed in microweave mode will be described as another supplemental embodiment of the present invention.

When a plurality of data files A, B, C, ... are included in an area corresponding to one page of the print page data file to be printed, a pointer table and a buffer area are provided in a storage device, e.g., an SDRAM to correspond to each image data file whenever an image data file is discovered by search of the image data file for every print lint position N (see the step S102 in the flowchart of FIG. 3).

Accordingly, when a plurality of data files A, B, C, ... are included in the area corresponding to one page of the print page data file to be printed, a pointer table and a buffer area corresponding to the image data file A, a pointer table and a buffer area corresponding to the image data file B, a pointer table and a buffer area corresponding to the image data file C, and the like are sequentially provided in the predetermined storage device such as the SDRAM.

As the predetermined storage device in which the pointer tables and the buffer areas corresponding to the respective image data files, a buffer provided in either the first processing device 11 or the second processing device 12 may be used or either the first storage device 21 or the second storage device 22 may be used. Alternatively, the other storage device (not shown) may be used as the predetermined storage device.

Attention is now paid to one image data file, e.g., the image data file A image data of the image data file A is sequentially decompressed and corrected according to the processing procedures shown in the flowchart of FIG. 3 (see the steps S104 and S105 in the flowchart of FIG. 3). The detailed processing procedures for the decompression processing are already described with reference to the flowcharts of FIGS. 4, 5, and 6.

The corrected image data is held in the buffer area provided for the image data file A. Furthermore, a file pointer indicating up to which segment of the compressed image data file A the decompression processing has been finished is saved in the pointer table provided for the image data file A.

Likewise, corrected image data of the other image data files B, C, ... are held in the buffer areas provided for the image data files B, C, ... , respectively. Furthermore, file pointers each indicating up to which segment of the compressed image data file B, C, ... the decompression processing has been finished are saved in the pointer tables provided for the image data files B, C, ... , respectively.

A size of each of the corrected image data sequentially extracted from the buffer areas corresponding to the respective image data files A, B, C, ... in the predetermined storage device Is converted into a printing size according to a print layout (see the step S106 in the flowchart of FIG. 3), arranged according to the print layout (see the step S107 in the flowchart of FIG. 3), and stored in a band buffer for every line.

The band buffer is a buffer for holding image data corresponding to a length of a print head, that is, corresponding to a band print region printable once from a top nozzle to a last nozzle of the print head.

As the band buffer, a buffer provided in either the first processing device 11 or the second processing device 12 may be used or either the first storage device 21 or the second storage device 22 may be used. Alternatively, the other storage device (not shown) may be used as the band buffer.

After the image data that has been subjected to the size conversion and the layout processing is stored in the band buffer for every line, when the image data has been stored by as much as the number of lines corresponding to the length of the print head, image data on each line for every predetermined lines corresponding to the microweave printing is extracted. Each image data is subjected to a halftone processing for converting a tone of each image into a tone at a gradient which the printer can deal with (see the step S109 in the flowchart of FIG. 3), thereby converting the image data into final print image data that can be actually printed. The final print image data is stored in a microweave printing buffer.

As the microweave printing buffer, a buffer provided in either the first processing device 11 or the second processing device 12 may be used or either the first storage device 21 or the second storage device 22 may be used. Alternatively, the other storage device (not shown) may be used as the microweave printing buffer.

While sequentially converting the respective image data and moving the respective image data from the band buffer into the microweave printing buffer, microweave printing is executed based on the image data on each line for every predetermined lines stored in the microweave printing buffer (see the step S110 in the flowchart of FIG. 3).

The instance in which a plurality of data files A, B, C, ... , are included in the area corresponding to one page of the print page data file to be printed has been described above. However, even if only one image data file is included in the area corresponding to one page of the print page data file, the processing procedures are the same as the processing procedures for processing the image data when the printing is performed in the microweave mode stated above.

What is claimed is:

1. An image processing method comprising:
a first processing routine comprising the steps of:
acquiring and loading from a first storage device a plurality of tables including a predetermined decompression table and a quantization table necessary to decompress a compressed image data file, the first storage device storing therein the plurality of tables,
acquiring and loading from a second storage device a plurality of parameters including a rotation information map and a file pointer created and updated while a compressed image data file is being decompressed, the second storage device storing therein the plurality of parameters, and
decompressing a compressed image data file; and
a second processing routine comprising the steps of:
acquiring and reading the plurality of tables stored in the first storage device and the plurality of parameters stored in the second storage device, and
reading and executing a decompression processing program for decompressing a compressed image data file, thereby decompressing a compressed image data file, the decompression processing program being stored in the first storage device;
wherein the first processing routine and the second processing routine are used in parallel, and, when a plurality of compressed image data files are decompressed by a parallel processing, one of the plurality of compressed image data files is decompressed using the first processing routine, and the remaining of the plurality of compressed image data files are decompressed using the second processing routine.

2. The image processing method according to claim 1, wherein, when the decompression processing subject is one compressed image data file, the one compressed image data file is decompressed using the first processing routine.

3. The image processing method according to claim 1, wherein an image data file compressed by JPEG compression is used as a decompression processing subject, JPEG being Joint Photographic Experts Group.

4. The image processing method according to claim 1, wherein a compressed image data file used as a decompression processing subject is subjected to an image correction processing after being decompressed.

5. An image processing apparatus comprising:
a first storage device storing therein a plurality of tables including a predetermined decompression table and a quantization table necessary to decompress a compressed image data file, and storing therein a decompression processing program for decompressing a compressed image data file;
a second storage device storing therein a plurality of parameters including a rotation information map and a file pointer created and updated while a compressed image data file is being decompressed;
a first processing device for acquiring and loading the plurality of tables stored in the first storage device and the plurality of parameters stored in the second storage device, and for decompressing a compressed image data file; and
a second processing device for reading and executing the decompression processing program stored in the first storage device, and for acquiring and reading the plurality of tables stored in the first storage device and the plurality of parameters stored in the second storage device, thereby decompressing a compressed image data file,
wherein, when a plurality of compressed image data files are decompressed by a parallel processing, one of the plurality of compressed image data files is decompressed by the first processing device, and the remaining of the plurality of compressed image data files are decompressed by the second processing device.

6. The image processing apparatus according to claim 5, wherein, when a decompression processing subject is one compressed image data file, the one compressed image data file is decompressed by the first processing device.

7. The image processing apparatus according to claim 5, wherein a compressed image data file used as a decompression processing subject is stored in a predetermined recording medium, and read by and input to at least one of the first processing device and the second processing device.

* * * * *